(12) United States Patent
Missimer et al.

(10) Patent No.: US 9,457,320 B2
(45) Date of Patent: Oct. 4, 2016

(54) PROCESSES AND APPARATUS FOR INHIBITING MEMBRANE BIO-FOULING

(75) Inventors: Thomas M. Missimer, Thuwal (SA); Kim Choon Ng, Thuwal (SA); Gary Amy, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 13/525,798

(22) Filed: Jun. 18, 2012

(65) Prior Publication Data
US 2012/0318737 A1 Dec. 20, 2012

Related U.S. Application Data

(60) Provisional application No. 61/498,871, filed on Jun. 20, 2011.

(51) Int. Cl.
| | |
|---|---|
| *B01D 61/06* | (2006.01) |
| *C02F 1/44* | (2006.01) |
| *B01D 65/02* | (2006.01) |
| *B01D 61/02* | (2006.01) |
| *C02F 103/08* | (2006.01) |

(52) U.S. Cl.
CPC ............ *B01D 65/02* (2013.01); *B01D 61/06* (2013.01); *C02F 1/441* (2013.01); *B01D 61/025* (2013.01); *B01D 2321/10* (2013.01); *B01D 2321/2066* (2013.01); *C02F 2103/08* (2013.01); *C02F 2209/03* (2013.01); *C02F 2209/44* (2013.01); *C02F 2301/02* (2013.01); *C02F 2303/16* (2013.01); *C02F 2303/20* (2013.01)

(58) Field of Classification Search
None
See application file for complete search history.

(56) References Cited

U.S. PATENT DOCUMENTS

| | | | |
|---|---|---|---|
| 3,853,756 A * | 12/1974 | Stana | 210/636 |
| 5,958,243 A * | 9/1999 | Lawrence et al. | 210/636 |
| 7,282,147 B2 | 10/2007 | Kirker et al. | |
| 7,294,274 B2 | 11/2007 | Kirker et al. | |
| 7,371,322 B2 | 5/2008 | Kirker et al. | |
| 7,563,375 B2 | 7/2009 | Liberman | |
| 2005/0023207 A1 | 2/2005 | Kirker et al. | |
| 2005/0023219 A1* | 2/2005 | Kirker et al. | 210/636 |
| 2005/0077227 A1 | 4/2005 | Kirker et al. | |
| 2005/0254968 A1 | 11/2005 | Patterson | |
| 2006/0073173 A1 | 4/2006 | Banach et al. | |
| 2007/0138096 A1* | 6/2007 | Tarr et al. | 210/650 |
| 2007/0246425 A1* | 10/2007 | Liberman | 210/636 |
| 2007/0295674 A1 | 12/2007 | Kirker et al. | |
| 2011/0000858 A1 | 1/2011 | Geiger | |

OTHER PUBLICATIONS

Li, Hong-yu, Christopher D. Bertram, and Dianne E. Wiley. "Mechanisms by which pulsatile flow affects cross-flow microfiltration." AIChE journal 44.9 (1998): 1950-1961.*
International Search Report and Written Opinion from PCT/US2012/42881 mailed Sep. 4, 2012.

* cited by examiner

Primary Examiner — Krishnan S Menon
(74) Attorney, Agent, or Firm — Steptoe & Johnson LLP

(57) ABSTRACT

Certain embodiments are directed to a process and apparatus for cleaning and/or regeneration of permeable or semipermeable membranes comprising modulating pressure of a feed stream feeding the permeable or semipermeable membrane and providing intermittent pressure pulses for cleaning and/or regeneration of the permeable or semipermeable membrane.

13 Claims, 4 Drawing Sheets

PROCESSES AND APPARATUS FOR INHIBITING MEMBRANE BIO-FOULING

CLAIM OF PRIORITY

This application claims priority to U.S. Provisional Patent Application No. 61/498,871 filed on Jun. 20, 2011, which is hereby incorporated by reference in its entirety.

BACKGROUND OF THE INVENTION

I. Field of the Invention

Embodiments of this invention are directed generally to membrane purification processes and apparatus. More particularly aspects are directed to processes and apparatus that reduce bio-fouling of a membrane.

II. Background

Membrane bio-fouling is a major and inherent problem in a variety of filtering processes, such as reverse osmosis seawater desalination. Bio-fouling occurs when the membrane face becomes conditioned with macro-organic compounds and ultimately bacteria attach to the membrane in clusters that become a film of variable thickness. A thin layer of biofilm reduces the efficiency of water flux passing through the membrane and requires it to be cleaned periodically. The cleaning process reduces plant operational efficiency and reduces the life expectancy of the membranes.

Methods of biofouling prevention suggested in the art include devices that involve evaluation of biofilm formation and cleaning using microwaves, vibration, or gas-generated pulses. Additional methods and apparatus are still needed to improve the longevity and efficacy of membranes, particularly membranes used in reverse osmosis methods and apparatus.

SUMMARY OF THE INVENTION

A steady flow of high pressure feed stream through and across a membrane influences the formation of biofilms. In the early stage of biofilm formation after conditioning of the membrane surface, bacteria begin to attach to the membrane surface in clusters. Initially, the cross-flow velocity of the feed water sweeps the material off the face of the membrane. However, as larger clusters of bacteria attach and multiply, the cross flow water velocity can no longer clean the membrane face.

Embodiments of the invention are directed to processes, systems, and apparatus to generate a pulsating flow of the feed water across and through the membrane, thereby detaching the colonies of bacteria before they can form large patches and ultimately an extensive biofilm. The pulsating pressures and flow would cause a surge in the cross flow velocity that would place the initial attached bacterial colonies in motion and cause detachment of the bacteria.

In certain aspects the pulsing flow can be produced by placing an eccentric, rotating vane-type impeller with an orifice across its diameter. The impeller can have adjustable spring-loaded vanes that sweep close to the volute of the housing. In certain aspects the impeller is pressure-driven and a constant rotational speed is generated across the high and low pressure headers. De-pressurization in the high pressure stream occurs momentarily when the through-hole orifice is aligned across the high and low pressure headers. Water being incompressible, the "momentary leakage" flow across the pressure headers gives rise to the formation of a pressure pulse and the rotation of the eccentric impeller gives successive pulses across the headers. The pulsating flow generated at the headers is transmitted to the seawater feed to the inlets of the RO membrane vessels or the array of membrane modules.

The pulse generating device has two tunable features. Firstly, the pressure amplitude of saline feed to the RO membranes can be tailored by selection of the orifice diameter. Secondly, the frequency of the pulses could be adjusted by the amount of eccentricity of the impeller to the volute center, and thereby adjusting the rotational speed. The pulsing flow provided by the impeller can control the concentration polarization as well as the necessary threshold cross-flow velocities on the surfaces of RO membranes. The impeller device can be run by the flow from the high pressure pump or could be powered using an external electric motor drive system.

The impeller valve could be operated in a steady pulsation mode, an episodic mode, or be turned off to maintain a constant flow. The ability to adjust the frequency of the pulsation or to not operate the device would be based on the biochemical and biological characteristics of the raw water. The duration of the pulsation would be operated for longer time periods or continuously when the raw seawater has high concentrations of bacteria and organic carbon, with corresponding higher potential rates of bio-fouling.

Certain embodiments are directed to a process for cleaning and/or regeneration of permeable or semipermeable membranes comprising modulating pressure of a feed stream feeding the permeable or semipermeable membrane and providing intermittent pressure pulses for cleaning and/or regeneration of the permeable or semipermeable membrane. In certain aspects the cleaning and regeneration inhibits bio-fouling of the permeable or semipermeable membrane. In certain aspects the permeable or semipermeable membrane is a reverse osmosis membrane. In a further aspect the intermittent pressure pulses range from 5, 50, 100, 200, 300, 400, 500, 600, 700 to 100, 200, 300, 400, 500, 600, 700, 800, 900, 1000, 1250, 1500 psi. The pressure pulses can fall within a range applicable to the specific process, including, but not limited to seawater at about 950 to 1050 psi; brackish water at about 180 to 350 psi; wastewater at about 70 to 15 psi. The potential pulse pressure range would be centered on the system operating pressure and bracket it by 5, 10, 15, 20% up and down of the specific range. In certain aspects the time for a single intermittent pressure pulse is about 0.01, 0.1, 10, 20, 30, 40 to 10, 20, 30, 40, 60 seconds in duration. In a further aspect the pressure pulse occurs about 1, 2, 3, 4, 5, 6, 7, 8, 9, 10 times every second, minute, or hour. In still a further aspect the process includes a series of pressure pulses is provided every 1, 2, 3, 4, 5, 6 7, 8, 9, 10 hours, days, weeks. In certain aspects the pressure pulse is preceded and followed by a de-pressurization of the feed stream.

In certain aspects the membrane type is a hollow fiber, spiral, flat sheet, tubular, ceramic, or a capillary sheet.

In certain embodiments the feed stream is seawater, brackish water, domestic wastewater, industrial wastewater, storm water, cheese whey, beer, wine, or food separations.

The process can include a pressure pulse system comprising one or more of: (a) piping having an inlet for aqueous feed carrying inorganic material and biological organisms; (b) a pump moving the aqueous feed along the piping; (c) the piping having a membrane for removing inorganic ions from the aqueous feed; and (d) an eccentric rotating vane impeller operatively coupled to the high pressure header and low pressure header of inlet, the impeller being configured to provide the intermittent pressure pulses across the membrane.

Certain embodiments are directed to a membrane cleaning apparatus comprising (a) a feed stream line operatively coupling a feed stream source and any other membrane type and (b) a pressure modulating device operatively incorporated to the feed stream at any point between the source of the feed stream and the membrane.

The pressure pulse generation device described herein is typically inserted into or fluidly coupled between the high pressure pump and the pressure vessel containing the reverse osmosis membrane.

A membrane is a permeable or a semipermeable material or combination of materials that is capable of retaining a fraction of a component in a feed water, the component being either a dissolved or a non-dissolved substance.

A process fluid or source fluid may be generally defined as a fluid stream containing liquids and/or gasses along with suspended solids, colloidal matter, microorganisms and/or particulate matter. Fluid permeable membranes may be used to separate various components of a process or source fluid into a clarified fluid and a concentrated fluid in accordance with teachings of the present invention. Membranes used to separate process fluids may generally be described as having an upstream side which is the side or face communicating with a process fluid. Membranes also have a downstream side or face communicating with clarified fluids removed from the process fluids.

Clarified fluids may include liquids, gasses, solids, particulate matter and/or colloidal matter which have been able to pass through or permeate through openings in an associated membrane. Clarified fluids may also be referred to as "permeate" or "permeate fluids".

Process fluids passing over the upstream side of a membrane gradually lose associated liquids and/or gaseous components by such components permeating through openings or pores in the membrane. The remaining process fluid generally becomes relatively more concentrated with a higher concentration of solids, colloidal matter and/or particulate matter which will not pass through openings or pores in the membrane. The accumulation of such materials on the upstream side of a membrane may be referred to as a "retentate" or "concentrated fluid".

The term "fluid" may be used to include liquids, gasses or a combination of liquids and gasses.

The use of the word "a" or "an" when used in conjunction with the term "comprising" in the claims and/or the specification may mean "one," but it is also consistent with the meaning of "one or more," "at least one," and "one or more than one."

It is contemplated that any embodiment discussed herein can be implemented with respect to any method or composition of the invention, and vice versa.

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or." It is also contemplated that anything listed using the term "or" may also be specifically excluded.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

By "consisting of" is meant including, and limited to, whatever follows the phrase "consisting of". Thus, the phrase "consisting of" indicates that the listed elements are required or mandatory, and that no other elements may be present.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
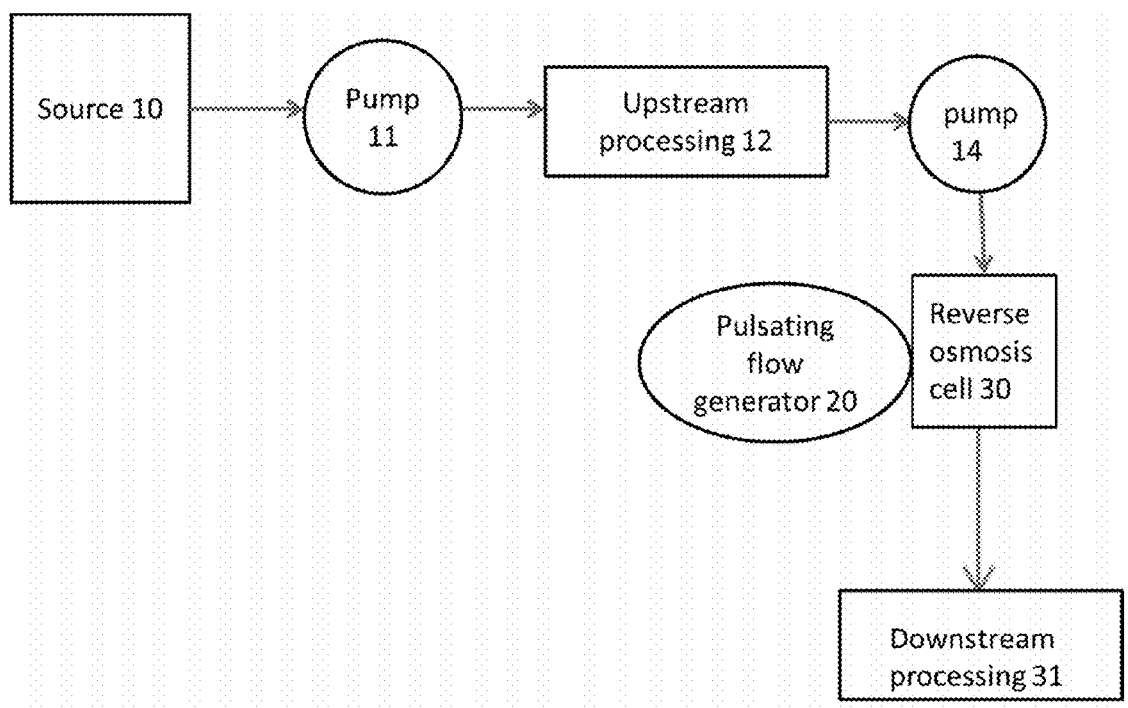
FIG. 1. Diagram of a system comprising a reverse osmosis cell.

Reverse osmosis (RO) is a filtration method that removes many types of large molecules and ions from solutions by applying pressure to the solution when it is on one side of a selective membrane. The result is that the solute is retained on the pressurized side of the membrane and the pure solvent is allowed to pass to the other side. To be "selective," this membrane should not allow large molecules or ions through the pores (holes), but should allow smaller components of the solution (such as the solvent) to pass freely.

In the normal osmosis process the solvent naturally moves from an area of low solute concentration, through a membrane, to an area of high solute concentration. The movement of a pure solvent to equalize solute concentrations on each side of a membrane generates a pressure and this is the "osmotic pressure." Applying an external pressure to reverse the natural flow of pure solvent, thus, is reverse osmosis. Reverse osmosis is most commonly known for its use in purification of drinking water, brackish-water, seawater, or wastewater, by removing the salt and other contaminant substances from the water molecules.

The treatment of water that contains microorganisms can limit the useful life of the semi-permeable membrane used in reverse osmosis. The microorganisms tend to become imbedded on the membrane surface and multiply and thicken, causing clogging and fouling (i.e., bio-fouling) of the reverse osmosis unit. The fouling reduces flux, necessitates cleaning, and reduces the life-expectancy of the membranes.

All municipal and industrial reverse osmosis systems utilize cleaning systems that force cleaning fluids through the membrane system to remove and flush the biofilm from the system. The cleaning action requires that the train must be taken off-line. The cleaning fluids and flushed water must be disposed of in the waste stream. Over the life of the membrane, the effectiveness of cleaning lessens and damage occurs to the membrane surface, thereby reducing its useful life expectancy.

The processes and apparatus described herein can be, but is not limited to use in the seawater desalination industry and would provide an additional approach to limit membrane bio-fouling, which affects commercial and industrial seawater reverse osmosis facility in the world. It would increase operational efficiency, increase membrane life by reducing cleaning cycles, and save operating cost. The device could be added in all new seawater reverse osmosis water treatment plants and could be retrofitted into existing plants.

The most common method of cleaning the membranes is to pump a special solution of water and chemicals through the membranes to clean the surface of the membranes. Experiments are being made using an ultrasound generator connected to the housing of the pressure vessel to assess the degree of biofouling and to help clean the membrane area, but this process is rarely or not used at all in the desalination industry as a whole (U.S. Pat. No. 6,161,435, which is incorporated herein by reference in its entirety). A vibrator cleaning method applied to hollow-fiber membranes was described in U.S. Patent Publication 2007/0295674, which is incorporated herein by reference in its entirety. The cleaning of membranes by pressurized gas pulsation was described in U.S. Pat. No. 7,531,042, which is incorporated herein by reference in its entirety.

Referring to FIG. 1, a treatment system can comprises a source 10, such as seawater, brackish water, wastewater, or other impaired water, to be treated to remove undesirable organic and inorganic material, so as to make fresh or potable water. The treatment system can comprise a source 10 that provides fluid to be treated (e.g., seawater). The system will comprise a one or more pumps 11 to move the fluid from the source into the pretreatment system and a second high-pressure pump 14 to move the partially-treated raw water from the pretreatment system into the pressure vessels containing the membranes. The system will comprise piping extending and/or connecting the various components of the system from the source to the outlet. Pumps 11 are provided for lifting fluid, pressurizing fluid and moving fluid through the system. At points along and in fluid communication with the piping is a series of processing stations for removing the unwanted organic and inorganic materials. The system can include one or more processing steps before the RO process treatment (upstream processing 12). Upstream processing 12 can include coarse filters, such as a sand media bed filter, to remove relatively large particles suspended in the source fluid. The coarse filters can be followed by one or more organic material removal filters, such as an activated carbon media bed filter, for removing oil and similar material. The organic material removal filters can be followed by one or more cartridge filters and/or an ultrafiltration filter for removing small suspended materials from the feed stream. Following one or more upstream filters or treatments the feed stream is pumped using a high pressure pump into the pressure vessels containing the membrane elements 30 comprising a reverse osmosis membrane that blocks the flow of dissolved inorganic ions, such as $K^+$, $Cl^-$, $Na^+$, and $Ca^{2+}$, past the membrane while allowing the flow of fresh water through the membrane. The high-pressure pump creates sufficient pressure at the upstream side of the membrane to overcome the osmotic pressure across the membrane and allows the process to overcome internal friction head losses. Operatively coupled to the reverse osmosis cell 30 is a pulsating flow generator 20. Methods to create pulsating flow include (a) placing a rotating disk inside the feed end of the pressure vessel with differing hole-sizes and offset feed line to produce a pulse or (b) use a valve in the high pressure feed line between the pump and the skid of vessels. The use of a valve is believed to be the most economic and requires no redesign and retrofitting of commonly-used pressure vessels. The pulsating flow generator provides intermittent pressure pulses that reduce bio-fouling of the membrane.

Figure 2:
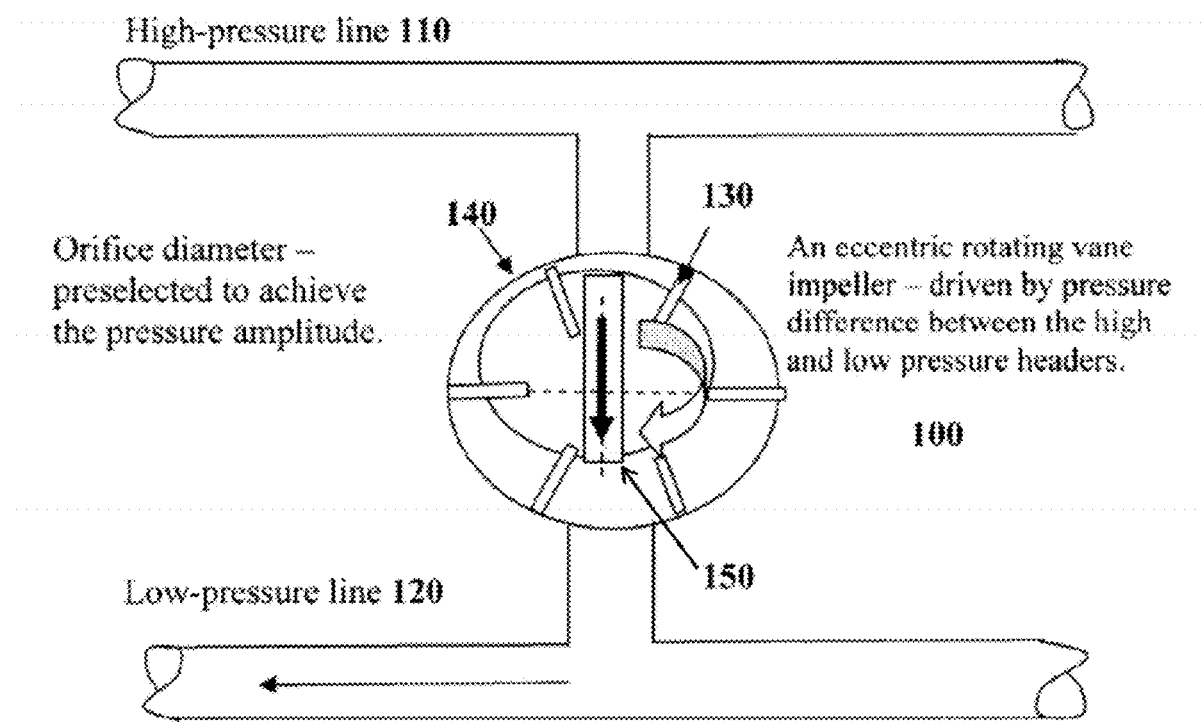
FIG. 2. Schematic diagram showing the generation of the pressure pulse.
Figure 3:
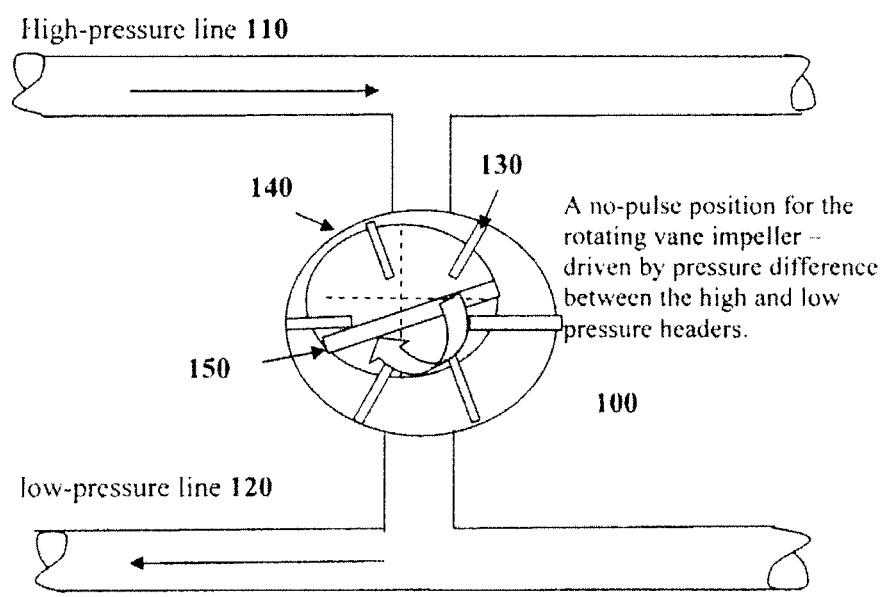
FIG. 3. Schematic of the impeller at no-pulse position.
Figure 4:
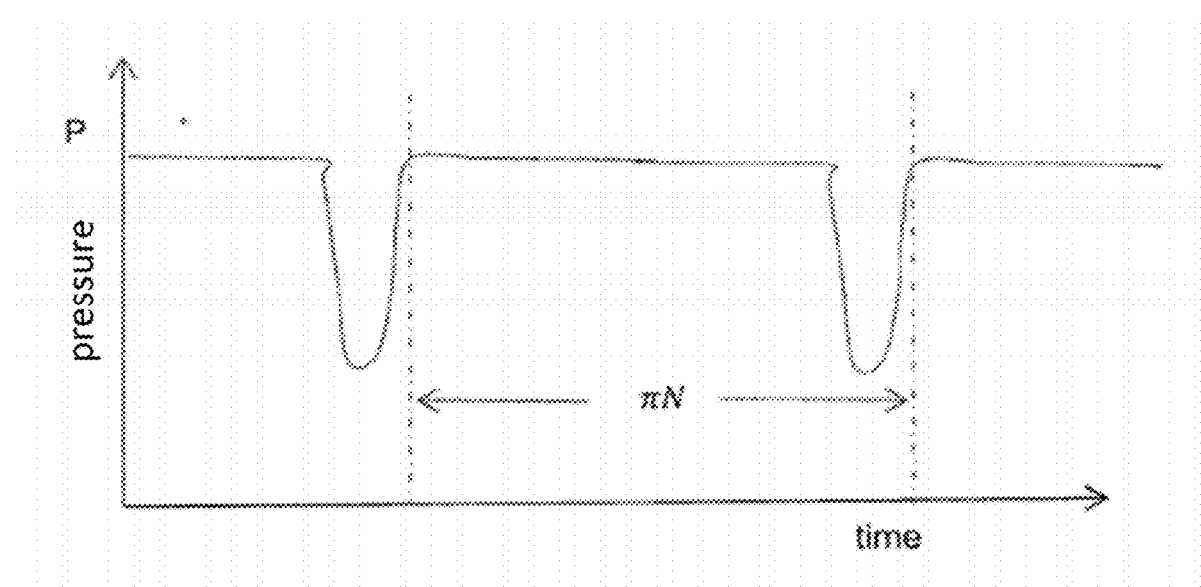
FIG. 4. Pressure pulse amplitude produced by the valve in operating mode.

FIG. 2 and FIG. 3 depict an example of a pulsating flow generator. An eccentric rotating vane impeller 100 is configured to be fluid communication with a high-pressure line 110 and a low-pressure line 120 that are comprised in the inlet manifold to one or more reverse osmosis cell 30 (not shown). The impeller 100 can have adjustable spring-loaded vanes 130 that sweep close to the volute of the housing 140. In certain aspects the impeller is pressure-driven and a constant rotational speed is generated across the high-pressure line 110 and low pressure-line 120. De-pressurization in the high pressure line 110 occurs momentarily when the through-hole orifice 150 is aligned across the high and low pressure lines. Water being incompressible, the "momentary leakage" flow across the pressure lines 110 and 120 gives rise to the formation of a pressure pulse (see FIG. 4) and the rotation of the eccentric impeller 100 gives successive pulses across the headers. The pulsating flow generated at the headers is transmitted to the seawater feed to the inlets of the RO membrane vessels or the array of membrane modules. As indicated in FIG. 4, $\pi N$ is period between the pulses.

The system will include a control panel or controller for controlling the operation of the system, and various valves apparatus positioned along the flow path to operate the flow along the piping and providing one or more pressure pulses at predetermined times and in predetermined timing and magnitude for enhanced longevity, efficiency and effectiveness of system.

In operation, the system receives the stream of fluid from the source and introduces the stream into the upstream processing steps that occur prior to reverse osmosis. After upstream processing the fluid or water is introduced to the reverse osmosis cell. The feed stream of the reverse osmosis cell is modulated to provide intermittent pressure pulses to inhibit bio-fouling. The reduced bio-fouling maintains the reverse osmosis membrane and maintains operation at optimum permeability. Source fluid or water can be lifted by pumps at a single or at multiple stations in a water or sea water lift bay.

REFERENCES

The following references, to the extent that they provide exemplary procedural or other details supplementary to those set forth herein, are specifically incorporated herein by reference.
U.S. Pat. No. 6,161,435
U.S. Pat. No. 7,531,042
U.S. Publn. 2007/0295674

What is claimed is:
1. A process for cleaning and/or regeneration of permeable or semipermeable membranes comprising:
providing a rotating impeller between a high pressure line and a low pressure line, the impeller having an orifice across its diameter and having adjustable vanes permitting fluid flow between the high pressure line and low pressure line;

allowing depressurization to occur when the orifice is aligned across the high pressure and low pressure lines;

modulating pressure of a feed stream feeding the permeable or semipermeable membrane by providing intermittent pressure pulses for cleaning and/or regeneration of the permeable or semipermeable membrane by rotating the impeller, the impeller being configured to provide the intermittent pressure pulses across the membrane.

2. The process of claim 1, wherein pressure of the intermittent pressure pulses is in the range of 5 to 1500 psi.

3. The process of claim 1 wherein the feed stream is seawater, brackish water, domestic wastewater, industrial wastewater, storm water, cheese whey, beer, or a liquid stream with a component of food.

4. The process of claim 1, wherein a time for a single intermittent pressure pulse is about 0.01 to 60 seconds in duration.

5. The process of claim 1, wherein a pressure pulse occurs about 1, 2, 3, 4, 5, 6, 7, 8, 9, 10 times every second, minute, or hour.

6. The process of claim 1, wherein a series of the intermittent pressure pulses is provided every 1, 2, 3, 4, 5, 6, 7, 8, 9, 10 hours, days, or weeks.

7. The process of claim 1, wherein a membrane type is a hollow fiber, spiral, flat sheet, tubular, ceramic, or a capillary sheet.

8. The process of claim 1, wherein a pressure pulse is preceded and followed by a de-pressurization of the feed stream.

9. The process in claim 1 further comprising:
(a) providing a source of fluid to be treated;
(b) providing a pump moving the fluid along a piping and pressurizing fluid through the system to an outlet; and
(c) connecting components from the source to the outlet with the piping, the piping having the permeable or semipermeable membrane for removing inorganic ions from the aqueous feed
(d) providing processing stations for removing unwanted material.

10. The process of claim 1, wherein the pulse pressure range is centered on the system operating pressure and bracketed by a 20% increase and decrease in the system operating pressure.

11. The process of claim 1, wherein the pulse pressure range is centered on the system operating pressure and bracketed by a 15% increase and decrease in the system operating pressure.

12. The process of claim 1, wherein the pulse pressure range is centered on the system operating pressure and bracketed by a 10% increase and decrease in the system operating pressure.

13. The process of claim 1, wherein the pulse pressure range is centered on the system operating pressure and bracketed by a 5% increase and decrease in the system operating pressure.

* * * * *